April 30, 1940. H. COANDA 2,198,655
DEVICE FOR FACILITATING THE DISCHARGE OF A GAS UNDER PRESSURE
Filed July 17, 1936 6 Sheets-Sheet 1

INVENTOR.
HENRI COANDA.
by Haseltine Lake &Co
ATTORNEYS.

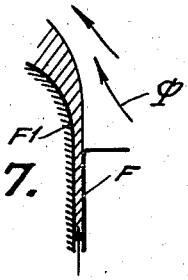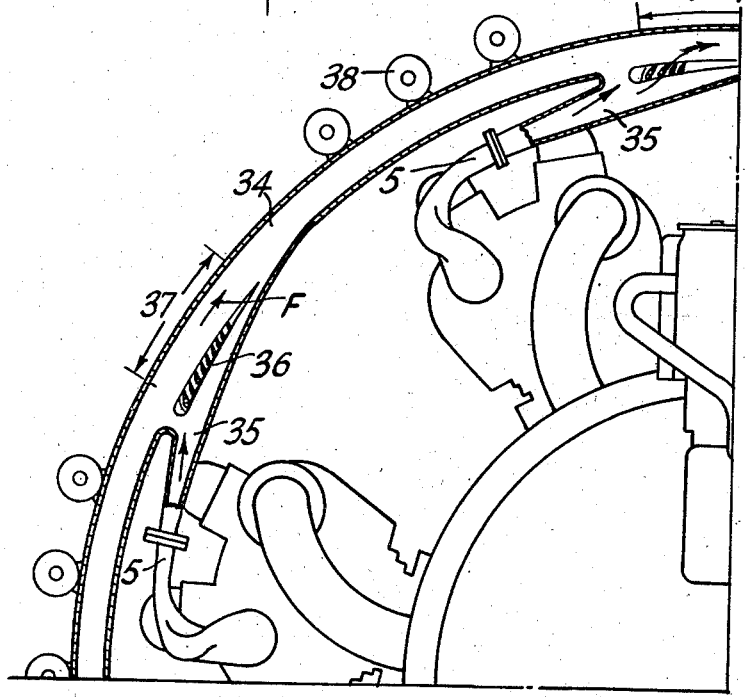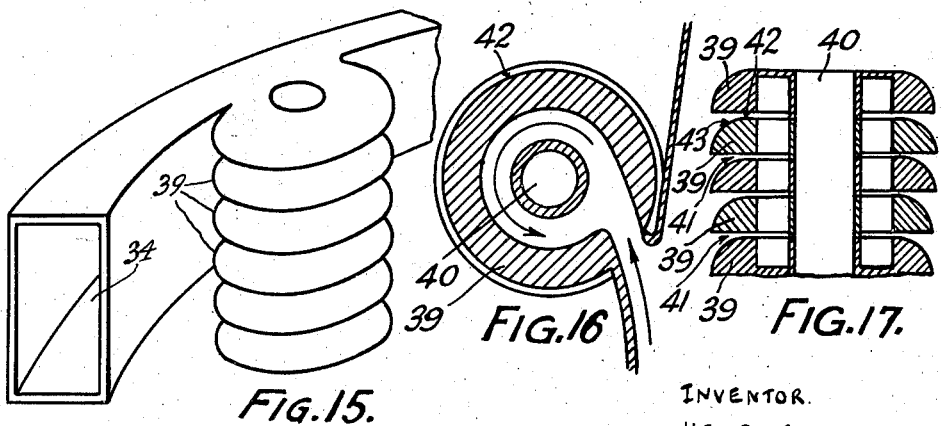

April 30, 1940.  H. COANDA  2,198,655
DEVICE FOR FACILITATING THE DISCHARGE OF A GAS UNDER PRESSURE
Filed July 17, 1936   6 Sheets-Sheet 4
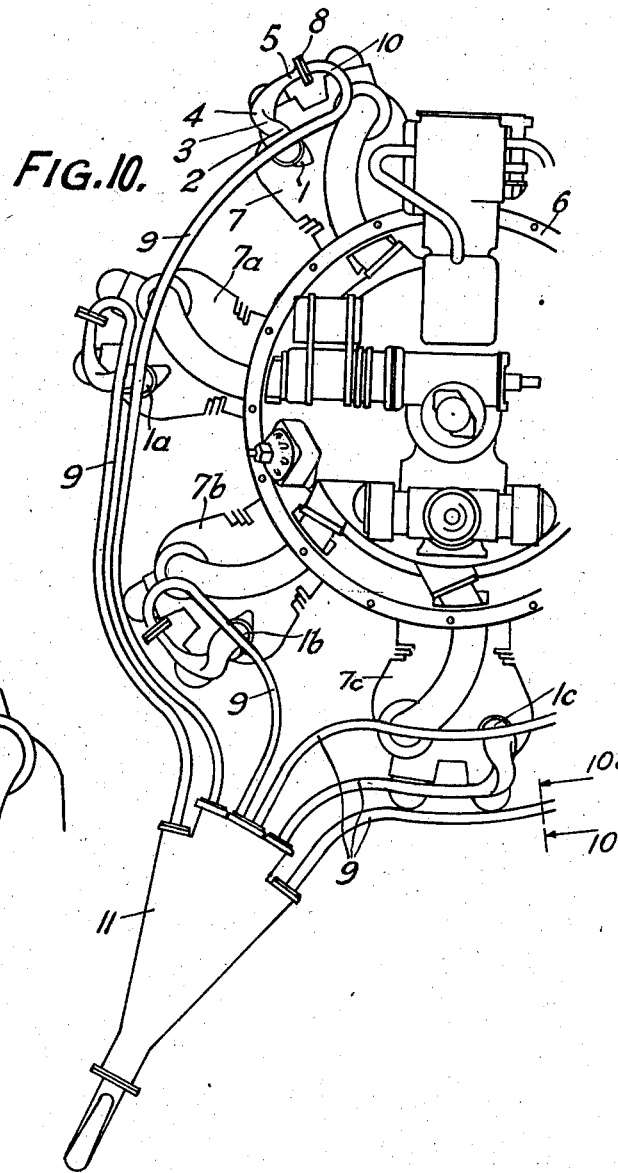
INVENTOR.
HENRI COANDA
by Haseltine Lake &Co.
ATTORNEYS.

April 30, 1940.  H. COANDA  2,198,655
DEVICE FOR FACILITATING THE DISCHARGE OF A GAS UNDER PRESSURE
Filed July 17, 1936  6 Sheets-Sheet 5
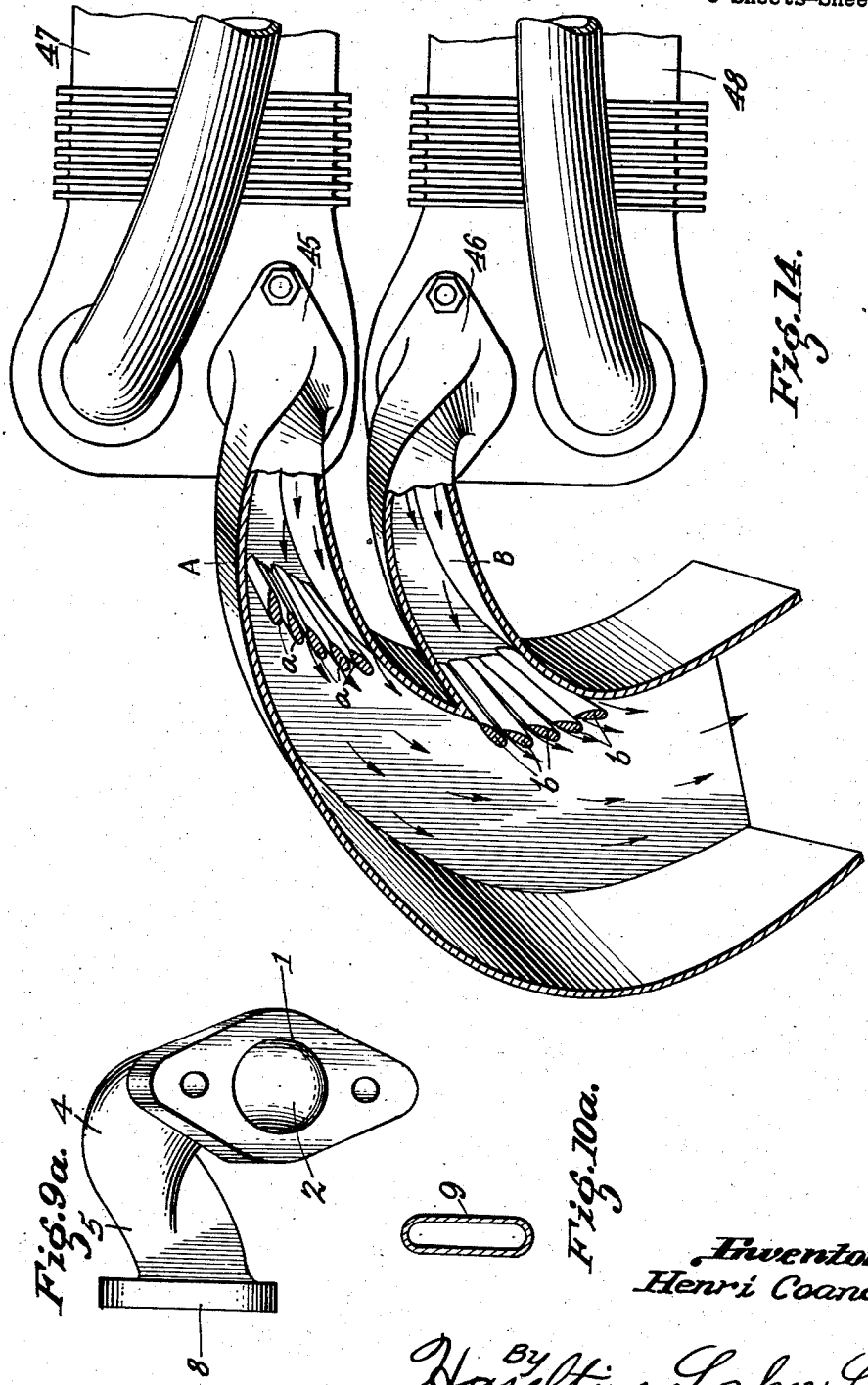
Inventor,
Henri Coanda
By Haseltine, Lake & Co.
Attys.

April 30, 1940.   H. COANDA   2,198,655
DEVICE FOR FACILITATING THE DISCHARGE OF A GAS UNDER PRESSURE
Filed July 17, 1936   6 Sheets-Sheet 6

INVENTOR
HENRI COANDA
by Haseltine Lake & Co
ATTORNEYS.

Patented Apr. 30, 1940

2,198,655

UNITED STATES PATENT OFFICE 2,198,655

DEVICE FOR FACILITATING THE DISCHARGE OF A GAS UNDER PRESSURE

Henri Coanda, Clichy, France

Application July 17, 1936, Serial No. 91,062
In France July 17, 1935

8 Claims. (Cl. 60—32)

The present invention relates to means for facilitating the discharge of gaseous fluid issuing under pressure and/or at a high temperature into another fluid at a lower pressure and/or at a lower temperature, and more particularly the discharge of the exhaust gases from internal combustion engines, and steam engines.

As the gases, especially in internal combustion engines, issue through valves or ports, the passage through the said valves or the said ports imparts a rotary motion to the gas, even if this rotation is not imparted by the turbulence or swirl inside the cylinder.

The object therefore of the present invention, taking into account the rotary movement, is not only to avoid impeding this movement of the gas but to encourage and accentuate it in such a manner that the gases, by their violent rotation, engender a centrifugal force which will oppose any movement or any tendency to return, into the cylinder, of the said discharging gases and which will oppose also any counter or back pressure action which might arise during the issue of the gases, as is the case in usual exhaust boxes. For this purpose it is proposed, to provide as close as possible to the exhaust orifices of the engine, a system of piping preferably of flat rectangular section, which piping has, over a certain distance, a spiral shape, and enabling the gases to be guided according to their natural tendency while at the same time accentuating it, in any desired direction; this direction may be different, at a given moment, from the general direction which the said gases followed at the moment when they left the cylinder.

In order that the invention may be more clearly understood reference will now be made to the accompanying drawings wherein, Figure 1 is an adiabatic diagram of an internal combustion engine.

Figures 7 and 8 diagrammatically illustrate the effect of exhaust gases issuing through very narrow slots into another fluid.

Figure 9 is a perspective view of a still further construction of exhaust piping according to the invention.

Figure 9a is another view of the same exhaust piping of Figure 9 as seen from a different position to reveal the shape better.

Figure 10 is a plan view of a radial aero engine provided with a system of exhaust piping according to the invention.

Figure 10a is a detail section of part of Figure 10, taken on line 10a—10a.

Figure 11:
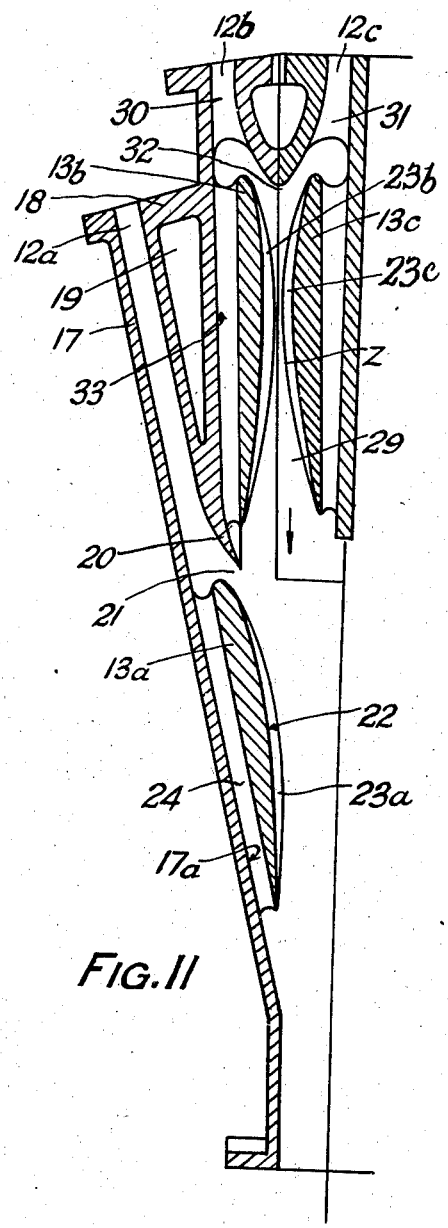

Figure 11 is a partial cross section of a collector into which various exhaust pipes lead.

Figure 12:
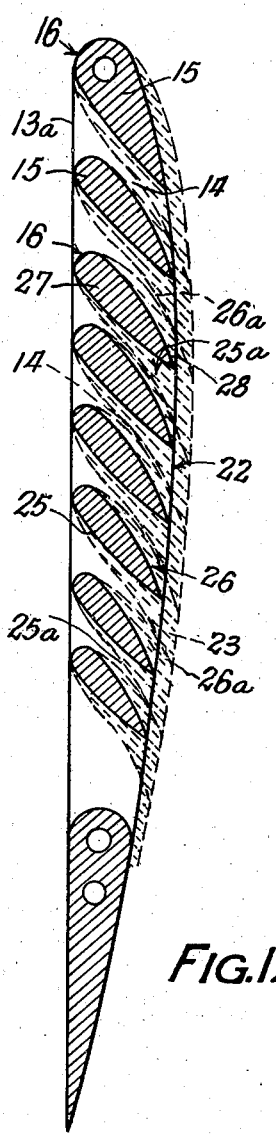

Figure 12 is a cross section of a detail of Figure 11.

Figure 13 is a plan view of a circular exhaust collector adapted to be fitted to radial aero engines.

Figure 14 is a section through an exhaust piping according to the invention provided with means for facilitating the discharge of the exhaust gases.

Figure 15 is a perspective view, on an enlarged scale, of one of the silencers used in connection with the collector of Figure 13.

Figure 16 is a horizontal section of the silencer of Figure 15.

Figure 17 is a vertical section of the silencer of Figures 15 and 16.

If the operation cycle curve of, for example, a four stroke combustion engine is examined, (see Fig. 1), it is found that during the period of expansion, as the result of the early exhaust opening, the curve between the abscisses $a$ and $b$ drops very rapidly before reaching the end of the downward stroke.

This drop may be considered as reducing the useful stroke during the working period (this working period being known as A). If, when the valve begins to open and until the piston reaches the lower end of its stroke the exit speed of the gases could be reduced, these could then increase to a certain degree the efficiency of the engine, subject, however, to the condition that when once the piston has begun to move upwardly the rate of flow of said gases should be increased in such a way as to take advantage of the partial vacuum which a very rapid outflow of the gases leaves behind it above the piston in order to assist the movement of the piston during its upward stroke up to the upper end of its travel (this second period being known as B).

In other words during period A a surplus energy may be obtained with counter pressure as a result, provided that this stored energy serves to produce a considerable vacuum which will act during the B period through its suction effect.

Figures 1, 2:
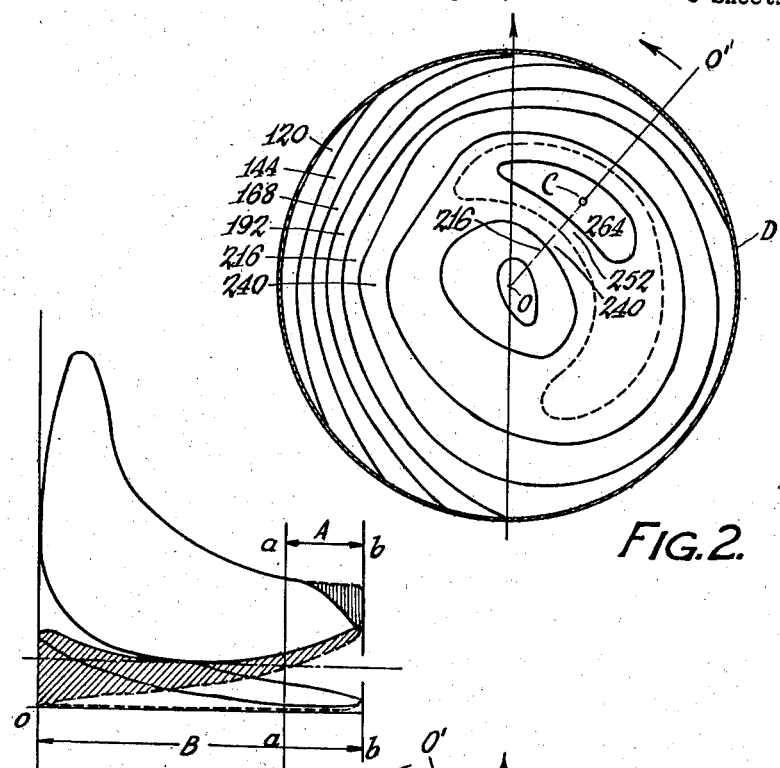
Figure 2 is a diagrammatic section of a straight cylindrical exhaust pipe at a distance of 55 millimeters from the engine, the curves of this figure corresponding to gas portions of the same speed.
Figure 3:
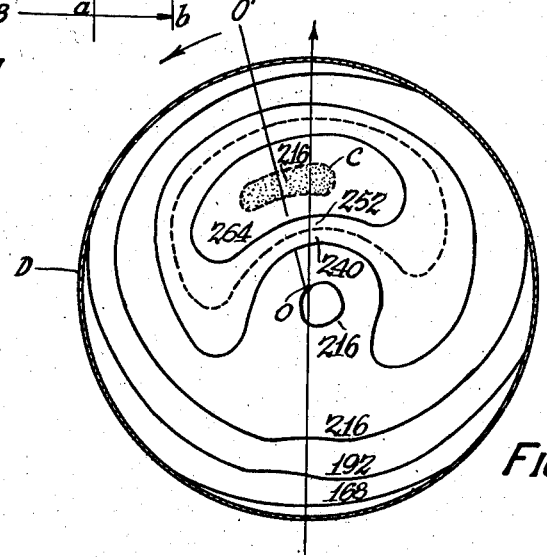
Figure 3 is a section analogous to Figure 2 taken at a distance of 115 millimeters from the engine.

Consequently if there is obtained during period A, by a suitable arrangement for the gas exhaust, a surplus of energy with, as a result, a counter pressure which gives the curve, in the space $ab$, the character of which is shown in dotted lines in Figure 1 and if there is created on the other hand a considerable vacuum during period B, the hatched zones between the abscissas $a$ and $b$, and between $b$ and $o$, given an idea of the increase of energy which is obtained and consequently of the increase in the efficiency of the engine resulting from this arrangement.

The increase of the length of the working period A of the piston can be obtained through a suitable arrangement of the exhaust, or, more generally, through a proper adjustment of the distribution.

On the contrary, the creation of an important suction in the cylinder above the piston during period B depends solely upon a suitable arrangement of the exhaust system, which must be devised in such manner as to be able to satisfactorily evacuate, without shock of counter pressure, the exhaust gases.

In order to obtain this result it is therefore necessary to lead the exhaust gases into the open air or into a silencer, in such a manner that they are slowed down as little as possible in the conduits.

Now the study of the movements of the gases on leaving the exhaust valve shows that said gases, when passing through this valve, are given a centripetal movement which is impeded in particular by the turbulence between the piston and the end of the cylinder.

That is to say, the movement of the gases in the cylinder proper is ordinarily not of such character as to be efficiently directed to ready exhaustion, whereas these gases when once past the exhaust valve will tend to swirl in the exhaust pipe in a turbulent manner which reacts on the gases in the cylinder so as to militate against continuity of outward flow and thus impede exhaustion.

To enable this to be clearly understood reference will now be made to Figures 2 to 6 which are cross sections through a straight cylindrical exhaust pipe at respectively 55, 115, 175, 205 and 265 mm. from its point of attachment to the engine, these sections giving a diagrammatic representation of the zones crossed by the sheets of gas at the same speed.

Figure 6:
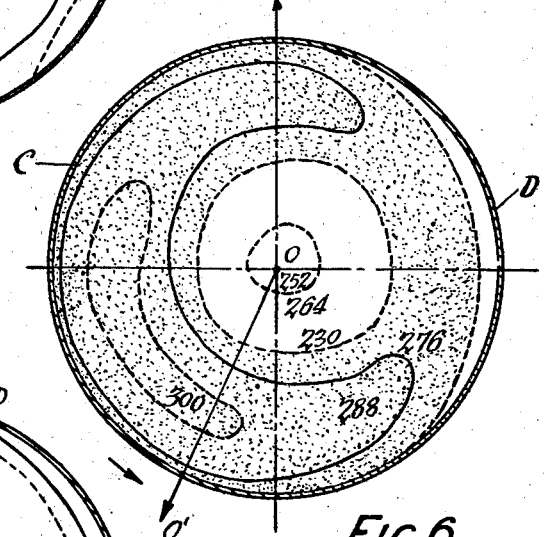
Figure 6 is a section analogous to Figure 2 taken at a distance of 265 millimeters from the engine.
Figure 5:
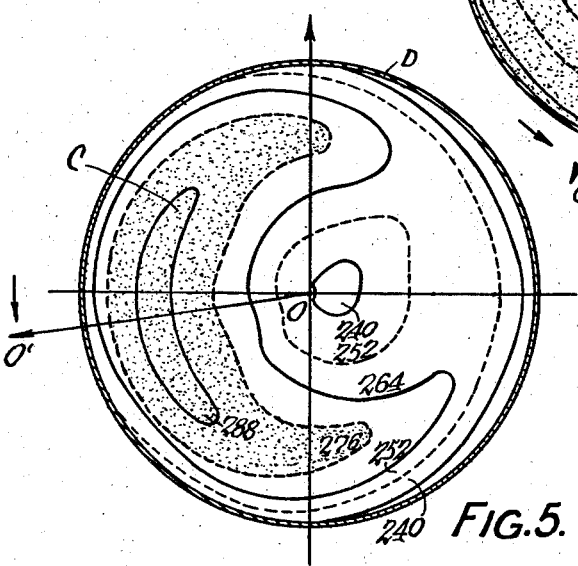
Figure 5 is a section analogous to Figure 2 taken at a distance of 205 millimeters from the engine.

It will be observed that the stippled zone, which is that through which is passed the gases flowing at high speed turns about the axis of the pipe through an angle of about 140° from the section shown by Figure 2 to the section shown by Figure 5, stretching out and flattening itself after a few centimetres and then, as shown by Figure 6, alters its shape as it approaches the end of the pipe.

In other words, the exhaust pipe D does not determine by its section the form of the areas or regions of greatest speed of movement, but, as especially shown in Figure 2, the greatest speed areas are found in the region crossed by the axis reaching from the center $0$ to $0'$. The highest speed area C is little more than a point in Figure 2, but in Figure 3, the same area C (shaded) has increased at the expense of the others and the same as well as the axis have swung around about 45° in a counterclockwise direction.

Figure 4:
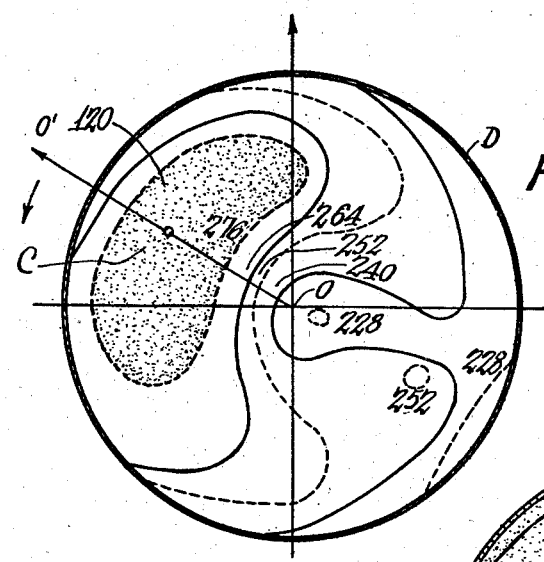
Figure 4 is a section analogous to Figure 2 taken at a distance of 175 millimeters from the engine.

In Figures 4 and 5, it is seen that the shaded high speed region C has progressively increased and swung around further about center $0$, assuming the shape of a bean. In Figure 6, the high speed region or area C practically fills the exhaust pipe D, assuming that the region thus considered is that containing all the gases flowing at a rate at least 276 m. per second. It will be noted that the mass of gas having the greatest speed (300 m. per second), still has the flattened form above mentioned.

If the gas is allowed to proceed further on its passage through the exhaust conduits, it is observed that the regions traversed by the high-speed gas and by the slow-speed gas will interfere, and will set up whirling movements in the conduits, and these, when added to the friction on the walls of the elbows of the conduit, and to the residual gas contained in said conduits, will impede the flow, and will cause a loss of energy which is prejudicial to the exhaust, and which thus reduces the rate of discharge of the gas from the cylinder. It is evident that in all the views just referred to, the rotation has continued so that the axis has swung around from the position of Figure 2 to the opposite position at $0'—0$ in Figure 6. The small numbers adjacent the various areas, shaded and open, are intended to indicate the approximate speed of flow in meters of the gases in said areas.

It follows that, in order to obtain a satisfactory flow of the exhaust gases, it will be necessary to give the exhaust pipe a shape corresponding to the outlines disclosed by the successive sections above referred to.

The exhaust piping according to the present application is therefore flattened and turned over on itself at the place where the exhaust gases present, in their high speed zone, namely those which are stippled in the attached drawings Figures 2 and 5, a flattened shape.

As soon as the stream of exhaust gas has assumed this flattened shape, the exhaust pipe conveys the stream in this form, either to the atmosphere or to an exhaust collector and/or a silencer.

Considering first Figure 7, it is found that if a gas moving at a high speed is ejected through a thin slot F, (of a size of about 1.5 mm.) provided with an outwardly curved prolonged lip $F_1$, it creates along said lip a zone of partial vacuum (shown by cross hatching) due to the fact that the gases are expanded beyond their initial volume. There is thus produced, along this cross hatched zone, a high suction due to the expansion of the fluid stream escaping at high pressure through the very thin slot F and constituting a zone into which the surrounding air rushes as shown by the arrow $\Phi$.

In Figure 8, I have shown a plurality of such slots $F_1$, $F_2$, $F_3$ arranged in series, so that their effects are added to one another, thus increasing the final suction obtained.

The present invention is based upon the application of these observations illustrated by Figures 2 to 6 on the one hand and 7 and 8 on the other hand.

An exhaust system according to the invention is illustrated in Figures 9, 9a and 10. Referring first to Figures 9 and 9a, the circular exhaust box $I$ carries a cylindrical pipe $2$ flattened at $3$, turned over upon itself at $4$, and prolonged by a rectilinear element $5$.

The places where the cylindrical exhaust piping is flattened and turned over depend upon the speed at which the exhaust gases escape from the engine cylinder, and upon the shape of the exhaust valve.

Referring to Figure 10, flattened pipe elements, similar to that shown by Figure 9, are fitted on the exhaust valves 1, 1a, 1b, 1c of a radial engine 6 having several radial cylinders 7, 7a, 7b, 7c.

Each of the flattened pipes 5 is connected by means of flanges 8 or the like to a flattened piping 9, bent for example at 10 and opening into collector 11. The latter, as seen in longitudinal section in Figure 11, consists of a single piece, cast for example, provided with a plurality of conduits 12a, 12b, 12c in which are wing-like structures 13a, 13b, 13c shown in modified longitudinal section by Figure 12, in the form of slotted wings. If gas is ejected at great speed through a narrow slot into the atmosphere and said gas is caused to flow along a curved extension of one of the lips of said slot, a zone of suction will be created along said extension.

In order to take advantage of this phenomenon, the wing-like structures 13a, 13b, 13c consist of a part made of solid elements 15 with spaces 14 between them, the solid parts 15 having preferably the shape of wings with fairly obtuse leading edges 16.

The wing-like structures are secured to the body of the collector at all suitable points, according to the number and arrangement of pipes 9.

The longest conduits, namely those which extend furthest into the collector, such as 12a, consist on the one hand of the wall 17 of the collector and on the other hand a part 18, hollowed out for example at 19, and ending into a slightly curved part 20, constituting on the one hand a deflector for the winged surface 13b and on the other hand a guide for the gases which issue from conduit 12a toward the back face 22 of wing-like structure 13a.

The path of the gases from the engine to the collector, is as follows:

After having been turned over and flattened in the bent and flattened piping 2—3—4—5, the gases pass through flat pipe 9 till they reach the flat conduits 12a, 12b, 12c etc. of the collector 11.

The gases flowing in through the conduit 12a pass through 24 and strike the wing 13a over the whole of its length as the result of the relative position of said wing with respect to the inner surface 17a of wall 17 and divide into elementary sheets, which pass through the intervals or slots 14 (Figure 12).

In view of the fact that the wing elements 15 are arranged in stepped relation to one another, so that each space 14 can be considered as equivalent to one of the slots F1, F2, F3 of Figure 8 (the curved prolonged lip being constituted by the trailing end of the lower wing element), zones of suction are produced along these respective trailing ends of elements 15. These zones of suction cooperate together and form a total zone of suction 23a along the back face of wing-like structure 13a.

It is this zone of suction 23a which draws through the free space 21 the portion of the gases fed through conduit 12a which have not passed through slots 14. This sheet of gas, passing through the free space 21, tends, as the result of the partial vacuum created along the back part 22 on wing 13a, to be drawn along by the same becoming attenuated and finally sucked out.

It will therefore be understood that in the zone comprised between two symmetrical wing-like structures such as 13b and 13c, a very strong suction is created.

This suction is the resultant of the suctions produced in zones 23b and 23c and it serves to draw in the gases from spaces 30, 31, 32 and supplied through pipes 12b and 12c.

It should nevertheless be noted that the end 20 of the part 18 forms a deflector and prevents the gases from pipe 12a from flowing back into conduit 12b formed between the element 13b and the right hand wall 33 of the part 18.

The collector ends, at its lower extremity, into a conduit which may be connected to any form of silencer or open into the outer air.

In the modification shown by Figure 13, the collector consists of a flat circular pipe 34 into which open the flat pipes 5 which end into a wide-mouthed opening 35 containing a winged surface 36 identical with the wing-like structures 13 of Figures 11 and 12 and which perform the same function in order to produce zones of suction along wing-like structures 36, which tends to draw in the direction of the arrow F the gases in pipe 34. The issue of the gases into the air may be effected through a plurality of silencer elements 39 on pipe 34 which are adapted to act as silencers which are preferably connected at a tangent to the pipe as seen in Figures 15, 16 and 17, the latter two showing sections transversely and vertically of this pipe and silencer elements.

The silencers in Figures 15 to 17 consist of a stack of annular washers 39 the axial part 40 of which is hollow to facilitate cooling. Between the stacked members are provided narrow slot-like passages 41, one of the lips of which 42 is curved at 43 so that the gaseous stream which issues from 41 produces a zone suction along 43.

It follows that in the case of single cylinder engines and if it were desired that each cylinder should have its individual exhaust, collector 34 is dispensed with and the exhaust is effected directly into the open air through a flat pipe such as 5, ending in a mouth 35 which is furnished, at its end part, with a winged surface 36 (Figure 13).

According to a further feature of the invention the stream of gas in each of a series of flat exhaust pipes leading from an engine to a common collector can be deviated in the desired direction (in accordance with the principle referred to above) at the moment at which they emerge into said collector in such a manner that the suction effect of one pipe assists in the discharge of the exhaust of the other pipe or pipes. An example of such an arrangement is shown in Figure 14 in which the flat pipes A and B leading from the engine are provided with streamlined partitions a and b set in the necessary direction to obtain the escape, suction and change of direction desired, on the principle described with reference to Figures 7 and 8.

Manifestly variations may be resorted to, and parts and features used without others within the scope of the invention.

What I claim is:

1. In an internal combustion engine, the combination of exhaust means having an opening of conventional cross section, and at least one tube connected with said exhaust means, said tube having a similar conventional cross section at its connection to said exhaust means and being gradually altered in form so as to be flattened and turned over upon itself in the form of a twisted bend at the point where the gaseous sheet rotating about itself assumes, in its portion flowing at high velocity and high pressure, a flattened or ribbon shape, said point being spaced a short distance exteriorly of said exhaust means.

2. In an internal combustion engine, the combinations of a plurality of exhaust means, one tube connected with each of these exhaust means, said tube being flattened and turned over upon itself, a collector for the flattened ends of said tubes, said collector including a plurality of conduits, adapted to communicate with said tubes, respectively, disposed slightly behind one another so as to act by suction on one another, and elements of aerofoil section fixed in said collector at the ends of said conduits respectively, said elements being shaped like slotted wings and having their leading edges engaged in the outlet ends of said conduits respectively.

3. In an internal combustion engine, the combination of a plurality of exhaust means, one tube connected with each of these exhaust tubes, said tube being flattened and turned over upon itself, at a certain distance from the outlet of said exhaust means, a collector for the flattened ends of said tubes, said collector including a plurality of conduits, adapted to communicate with said tubes, respectively, said conduits being arranged in stepped relationship so as to act by suction on one another, and elements of general aerofoil section fixed in said collector at the ends of said conduits, respectively, with their leading edges engaged in the outlet ends of said conduits, said elements consisting of a plurality of parts of wing-shaped section arranged at intervals from one another.

4. In an internal combustion engine, the combination of a plurality of exhaust means, one tube connected with each of these exhaust means, said tube being flattened and turned over upon itself at a certain distance from the outlet of said exhaust means, a collector for the flattened ends of said tubes, said collector including a plurality of conduits, arranged to communicate with said tubes, respectively, and disposed in stepped relationship to one another so as to act by suction on one another, and structures of general aerofoil section fixed in said collector at the respective ends of said conduits, substantially in line therewith, with their leading edges engaged in the outlet ends of said conduits respectively, each of these structures consisting of a plurality of elements of thick wing section having their chords disposed transversely to the direction of the corresponding conduit, said elements being spaced apart from one another.

5. In an internal combustion engine, the combination of a plurality of exhaust means, one tube connected with each of these exhaust means, said tube being flattened and turned over upon itself at a certain distance from the outlet of said exhaust means, a collector for the flattened ends of said tubes, said collector including a plurality of conduits, arranged to communicate with said tubes respectively and disposed in stepped relationship to one another so as to act by suction on one another, structures of general aerofoil section fixed in said collector at the respective ends of said conduits, substantially in line therewith, with their leading edges engaged in the outlet ends of said conduits respectively, each of these structures consisting of a plurality of elements of thick wing section having their chords disposed transversely to the direction of the corresponding conduits, said elements being spaced apart from one another, and deflectors provided at the outlet ends of said conduits, respectively, so as to prevent backward flow of the gases.

6. In an internal combustion engine, the combination of a plurality of exhaust means, said tube connected with each of these exhaust means, said tube being flattened and turned over upon itself at a certain distance from the outlet, a collector for the flattened ends of said tubes, said collector consisting of a circular flat tube surrounding the engine, an enlarged tube element connecting each of the first mentioned flat tubes with said collector, and an aerofoil structure of slotted wing section disposed in said enlarged tube element.

7. In an internal combustion engine, the combination of a plurality of exhaust means, one tube connected with each of these exhaust means, said tube being flattened and turned over upon itself at a certain distance from the outlet, a collector for the flattened ends of said tube, said collector consisting of a widened flat tube communicating with the outlet ends of said first mentioned tubes, widening connecting conduits interposed between said first mentioned tubes and said collector, and an aerofoil structure of slotted wing section disposed in each of said connecting conduits, respectively.

8. In an internal combustion engine, the combination of a plurality of exhaust means, one tube connected with each of these exhaust means, said tube being flattened and turned over upon itself at a certain distance from the outlet, a collector for the flattened ends of said tubes, said collector consisting of a flat tube communicating with the outlet ends of said first mentioned tubes, connecting conduits of gradually increasing width interposed between said first mentioned tubes and said collector, an aerofoil structure of slotted wing section disposed in each of said connecting conduits, respectively, and a muffler consisting of a plurality of ring-shaped elements arranged in cylindrical disposition next to one another; said elements opening outwardly through annular slots one of the edges of each of which is prolonged by a boss, said muffler being arranged in tangential relation with said collector that is to say with its axis parallel thereto

HENRI COANDA.